Dec. 10, 1935. S. O. TAYLOR ET AL 2,024,071
BOLT
Filed July 28, 1932
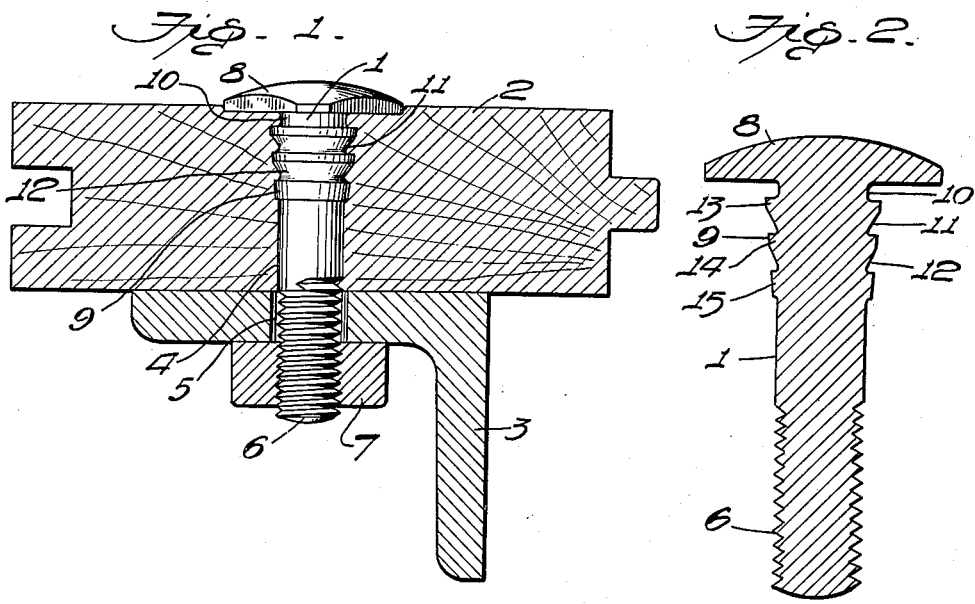
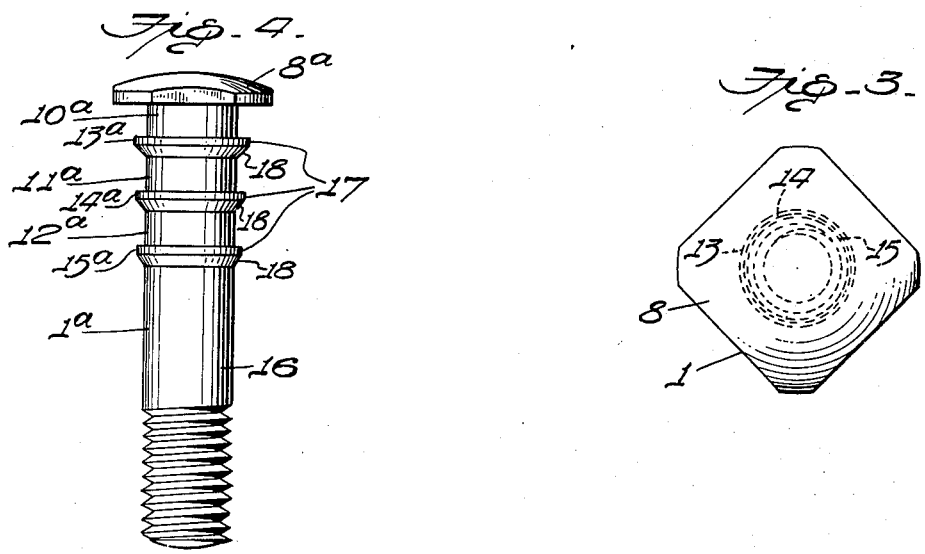
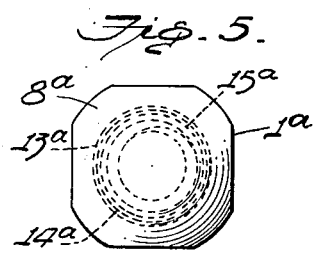
Steadman O. Taylor
Sven J. Strid
INVENTORS
BY Towson Price
ATTORNEY Patented Dec. 10, 1935

2,024,071

UNITED STATES PATENT OFFICE 2,024,071

BOLT

Steadman O. Taylor, University City, Mo., and Sven J. Strid, Chicago, Ill., assignors to William E. Sharp, Chicago, Ill.; Minnie E. Sharp executrix of the estate of said Sharp, deceased Application July 28, 1932, Serial No. 625,384

6 Claims. (Cl. 85—1)

This invention relates to bolts and, more particularly, to such for fastening a wood part of a railway freight car to a metal frame.

The principal object of our invention, generally considered, is the provision of bolts particularly adapted for connecting wood sheathing, lining, roofs, running-boards and floors to metal or wood framing, and which, when in place, lie in fluid-tight relation with the wood to thereby prevent the entry of moisture into the bolt hole along the shank of the bolt, so that rotting of the wood and other undesirable results are avoided.

Another object of our invention is to provide a bolt especially adapted for connecting wood and metal parts which may be used with such parts after the same have merely been drilled or apertured for receiving the minimum section of the bolt, said bolt, when in place, being drawn into such tight engagement that those portions of the wood surrounding the bolt shank have been put under pressure, forcing them into all voids to such an extent that the most extreme shrinkage or warpage of the wood will not relieve the holding pressure sufficiently to admit moisture, whereby the bolt opening is sealed against the entrance of water and air, so that not only is rotting of the wood minimized, but the entrance of warm air, for example, into refrigerator cars, is prevented.

A further object of our invention is to provide a bolt with an intermediate portion of the shank tapered and formed with peripheral grooves providing axially spaced annular fins which are preferably frusto-conical on their outer surfaces and the fin adjacent the bolt head is of a greater diameter than the fin or fins disposed toward the other end of the bolt, so that if more than one fin is employed, said fins increase in diameter toward the head, so that when driven into place in wood a fluid-tight connection therebetween is provided.

Other objects and advantages of the invention relating to the particular arrangement and construction of the various parts will become apparent as the description proceeds.

Referring to the drawing illustrating our invention, the scope whereof is defined by the appended claims:—

Figure 1 is a fragmentary view in transverse section of a wooden sheathing and an associated metal frame portion with a preferred form of our bolt shown in side elevation used for connecting said wood and metal parts.

Figure 2 is a sectional view of the bolt shown in Figure 1 taken through the axis thereof.

Figure 3 is a head end view of the bolt shown in Figures 1 and 2.

Figure 4 is a side elevation of a modified form of our bolt.

Figure 5 is a head end view of the form of bolt shown in Figure 4.

In connecting wood and metal structural members such as parts of railway vehicles, it has been customary to use bolts commonly designated as "carriage" bolts with heads, the outer surfaces of which are generally spherical and the inner surfaces of which are plain, with the shank of the bolt adjacent the head generally square or non-circular in section to minimize turning of the bolt when the nut is applied to the other end. When such bolts are employed with the head engaging the adjacent surface of the wood, either said head projects beyond the surface of the wood or it is necesary to countersink the wood to receive the head so that the outer surface thereof may lie normally flush with the surface of the wood. In either event, the bolt requires a bigger hole in the wood than its outside diameter, so that any moisture which strikes the exposed end of the bolt travels along its shank and enters the hole in the wood, resulting in premature decay of the wood, as well as permitting the transfer of moisture and possibly air from one side of the wood to the other.

To overcome such an undesirable condition, we have devised a waterproof and air-tight bolt by providing the shank of such a bolt with a tapered portion adjacent the head, grooved to provide one or more axially spaced fins which gradually increase in diameter toward the head, the peripheral surface of each fin preferably being frusto-conical with the large diameter toward the head, so that when such a bolt is driven into wood, the wood being, of course, first provided with a hole of a diameter corresponding with the minimum diameter of the unthreaded portion of the bolt, the tapered portion provided with fins will crowd the wood fibers surrounding the same so that they fill the groove between the fins and provide an air- and water-tight joint.

Referring now to the drawing in detail, like parts being designated by like reference characters, and first considering the embodiment of my invention illustrated in Figures 1, 2 and 3, there is shown a bolt 1, which, in Figure 1, is represented as connecting wooden sheathing 2 to a portion of a metal car frame 3 as by extending through registering apertures 4 in the sheathing and 5 in the frame. The end or shank 6 of the bolt protruding beyond the frame 3 has applied thereto a nut 7, which nut, when screwed tight on the threaded end of the bolt, desirably forces the head 8, the outer surface of which is preferably slightly convex or substantially flat, into the wood 2 until it is nearly flush with the outer surface thereof. The head 8 is preferably approximately square, rectangular, or provided with opposite straight and substantially parallel sides so that it may be conveniently prevented from turning while the nut 7 is tightly applied.

In order to make an air- and water-tight joint with the wood 2, we preferably make the hole 4 in the bolt of a diameter corresponding with that of the end of the bolt before threading for the nut 7 and form that portion of the shank 6 of the bolt adjacent the head on a slight taper with respect to the bolt axis from near said head toward the other end to a diameter slightly greater, for example, .020" greater than the normal diameter of said shank, and we groove said tapering or frusto-conical portion 9, as indicated at 10, 11 and 12, so as to leave peripheral fins or ribs 13, 14 and 15 therearound. The grooves 10, 11 and 12 may be generally V-shaped as shown, and so applied that the diameter of the bolt at the roots of said grooves corresponds with the nominal bolt diameter, thereby avoiding excessive strength toward the bolt head and also providing grooves of increasing depth toward said head.

From a consideration of the method of forming the fins or peripheral ribs 13, 14 and 15, it will be seen that the peripheral surfaces of said fins are frusto-conical with the large diameters toward the head 8 of the bolt, and that the fin 13 nearest the head is of a diameter greater than the remaining fins, said fins decreasing in diameter as they depart from the bolt head. Although we have illustrated a bolt with three fins applied on the shank thereof, it will be understood that we do not wish to be limited to this showing, as one or more of such frusto-conical surfaced fins may be employed.

In applying such an improved bolt, the aperture 4 of the wood is desirably made to correspond in size with the normal diameter thereof, or that having the threads 11 thereon, so that when the tapered or ribbed portion of the shank having the fins or fin thereon engages the apertured portion in the wood, said wood is expanded to correspond with the increasing tapered portion of the bolt. In this way, the bolt is not only forced into tight engagement with the wood, but the wood is compressed around the bolt with a pressure greater than any relief that can be obtained by drying out the wood, so that whether the wood is wet or dry, the bolt is always under pressure to exclude air and moisture from between the wood and shank of the bolt. The head may be forced into position with a hammer or said head may be prevented from turning by means of a wrench, or the like, while the nut is tightened, so that the head is forced into position, for example, as illustrated in Figure 1, where it tightly engages the adjacent surface of the wood and is substantially flush therewith.

Referring now to the embodiment of our invention illustrated in Figures 4 and 5, a bolt 1ª is shown which corresponds substantially with the bolt 1 of the previous embodiment, except that the grooves 10ª, 11ª and 12ª have substantially cylindrical bottoms so that they represent, in effect, extensions of the cylindrical portion 16 of the bolt, each fin being approximately uniform in axial dimension with its peripheral surface 17 frusto-conical and forming, in effect, a continuation of the conical or tapered surface connecting the fins 13ª, 14ª and 15ª. The surfaces 18 of the fins are preferably frusto-conical or beveled into the shank of the bolt at a greater angle than the peripheral surfaces 17, as shown most clearly in Figure 4. The head 8ª of the bolt 1ª may correspond generally with the head 8 of the preceding embodiment, but, in the present instance, is shown as somewhat smaller. The bolt of the present embodiment may be used as the bolt of the preceding embodiment.

From the foregoing, it will be seen that we have devised a bolt particularly adapted for connecting wood and metal, although not limited to such use. Bolts such as have been described are designed more particularly for use on railway freight cars for fastening wood parts such as lining or sheathing to the wood or metal frame of the cars.

Although preferred embodiments of our invention have been illustrated, it will be understood that modifications may be made without departing from the spirit and scope of the appended claims, and that our bolt may also be used generally wherever it is desired to bolt parts together, and is preferably formed of metal and adapted for use with self-locking or grip nuts as well as common nuts.

We claim:—

1. A bolt comprising a shank with a head on one end, said shank having a series of peripheral fins axially spaced therealong adjacent said head, the series increasing in diameter, so that the fin of largest diameter is disposed nearest said head, the peripheral surface of each fin being normally substantially frusto-conical with the large diameter toward said head, and that portion of the shank adjacent the end away from the head being constructed for connection with the nut.

2. A bolt comprising a shank with a head on one end, said shank being formed with a peripheral fin adjacent said head, said fin having a frusto-conical outer surface tapering toward a vertex away from said head, the other end of said shank being threaded for the application of a nut.

3. A bolt comprising a shank with a head at one end, the other end portion of said shank being threaded for the application of a nut, and that portion of the shank near the head being tapered to an increased diameter adjacent said head, the tapered portion of said shank being formed with annular grooves around the peripheral surface thereof, leaving continuous axially spaced fins with frusto-conical surfaces.

4. A two-part separable fastener consisting of a nut and a bolt, the shank of which is provided with a head and has a threaded end portion on and off which the nut may be screwed, characterized in that a portion of the bolt shank between its head and threaded end portion is tapered and formed with annular grooves around the peripheral surface, so that when placed in a bolt-hole of corresponding size in material like wood, the tapered and grooved portion of the shank is adapted to engage the bolt-hole wall with progressively increasing tightness of fit, until it lies in fluid-tight relation therewith.

5. A bolt comprising a shank with a head at one end, the other end portion of said shank being threaded for the application of a nut, and that portion of the shank near the head being tapered to an increased diameter adjacent said head, the tapered portion of said shank being formed with generally V-shaped annular grooves around the peripheral surface thereof, leaving continuous axially spaced fins with relatively blunt substantially frusto-conical side surfaces and relatively acute substantially frusto-conical outer surfaces.

6. A bolt comprising a shank with a head at one end, the other end portion of said shank being threaded for the application of a nut, and that portion of the shank near the head having a series of peripheral fins axially spaced therealong, the series increasing in diameter so that the fin of largest diameter is disposed nearest said head, the peripheral surface of each fin being normally substantially frusto-conical with the large diameter toward said head, and those portions of said shank between said fins being generally cylindrical and of a diameter corresponding with that of the shank between the fin farthest from the head and the threads.

STEADMAN O. TAYLOR.
SVEN J. STRID.